(12) United States Patent
Koenig et al.

(10) Patent No.: US 9,850,912 B2
(45) Date of Patent: Dec. 26, 2017

(54) BEARING HOUSING OF AN EXHAUST-GAS TURBOCHARGER

(71) Applicant: BorgWarner Inc., Auburn Hills, MI (US)

(72) Inventors: Lothar Koenig, Schmalenberg (DE); Thomas Koerner, Recklinghausen (DE)

(73) Assignee: BorgWarner Inc., Auburn Hills, MI (US)

( * ) Notice: Subject to any disclaimer, the term of this patent is extended or adjusted under 35 U.S.C. 154(b) by 296 days.

(21) Appl. No.: 14/358,345

(22) PCT Filed: Nov. 19, 2012

(86) PCT No.: PCT/US2012/065804
§ 371 (c)(1),
(2) Date: May 15, 2014

(87) PCT Pub. No.: WO2013/078117
PCT Pub. Date: May 30, 2013

(65) Prior Publication Data
US 2014/0314551 A1 Oct. 23, 2014

(30) Foreign Application Priority Data
Nov. 24, 2011 (DE) .......... 10 2011 119 417

(51) Int. Cl.
| | | |
|---|---|---|
| *F01D 25/16* | (2006.01) |
| *F04D 29/40* | (2006.01) |
| *F02B 39/00* | (2006.01) |
| *F02B 39/14* | (2006.01) |
| *F01D 25/18* | (2006.01) |
| *F02C 6/12* | (2006.01) |

(52) U.S. Cl.
CPC .......... *F04D 29/403* (2013.01); *F01D 25/16* (2013.01); *F01D 25/18* (2013.01); *F02B 39/00* (2013.01); *F02B 39/14* (2013.01); *F02C 6/12* (2013.01); *F05D 2220/40* (2013.01)

(58) Field of Classification Search
CPC ........ F04D 29/403; F01D 25/18; F01D 25/16; F02C 6/12; F02B 39/00; F02B 39/14; F05D 2220/40
USPC ................................. 415/170.1, 111
See application file for complete search history.

(56) References Cited

U.S. PATENT DOCUMENTS

| | | | |
|---|---|---|---|
| 4,128,283 A | 12/1978 | Palmer | |
| 5,308,169 A * | 5/1994 | Baker .................. | F01D 25/168 384/121 |
| 2004/0255582 A1 | 12/2004 | Sumser et al. | |

(Continued)

FOREIGN PATENT DOCUMENTS

| | | |
|---|---|---|
| JP | 2009121273 A | 6/2009 |
| WO | 2006095361 A1 | 9/2006 |

*Primary Examiner* — Laert Dounis
*Assistant Examiner* — Kelsey Stanek
(74) *Attorney, Agent, or Firm* — Eric L. Doyle; Stephan A. Pendorf; Patent Central LLC

(57) ABSTRACT

A bearing housing (1) of an exhaust-gas turbocharger 2, having an oil guide to at least one bearing point (5) in the bearing housing (1). The oil guide is formed by at least one of bores and cutouts in the bearing housing (1). There is formed in the oil guide a siphon (10) which is integrated into the bearing housing (1).

7 Claims, 3 Drawing Sheets

(56) References Cited

U.S. PATENT DOCUMENTS

Figure 1:
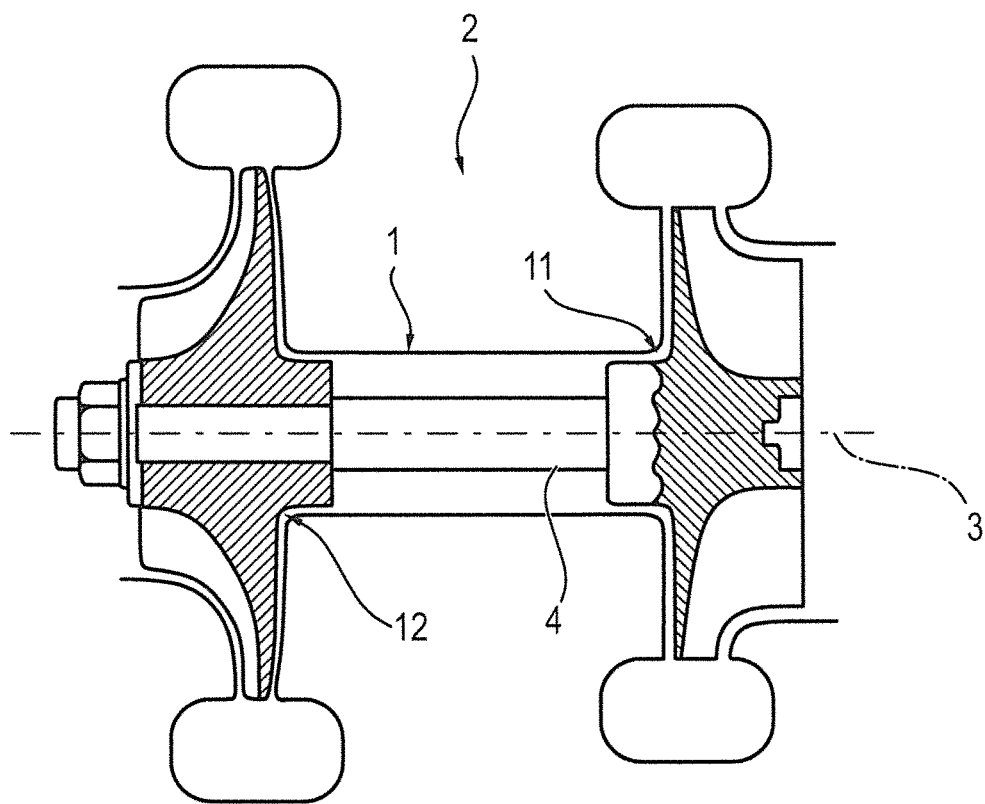

| | | | |
|---|---|---|---|
| 2010/0061855 A1* | 3/2010 | Shashank | F01D 25/18 416/174 |
| 2010/0175377 A1* | 7/2010 | Hippen | F02B 37/10 60/602 |
| 2012/0003081 A1* | 1/2012 | Woollenweber | F01D 5/082 415/180 |

* cited by examiner

BEARING HOUSING OF AN EXHAUST-GAS TURBOCHARGER

The invention relates to a bearing housing of an exhaust-gas turbocharger and to an exhaust-gas turbocharger having the bearing housing.

A fast supply of oil to the bearing arrangement of an exhaust-gas turbocharger is crucial in particular during a cold start at low temperatures. Since the hot oil in the lines can drain out after the engine is shut down, and since, during the cold start, under some circumstances, the supply of oil takes too long owing to high oil viscosity, damage to the bearing points can occur.

It is therefore an object of the present invention to provide a bearing housing which has an oil supply device which is of simple construction and which permits an adequate supply of oil to the bearing points of the bearing housing in particular during a cold start.

Said object is achieved by means of the features of claim 1. The subclaims relate to advantageous refinements of the invention.

The object is thus achieved by means of a bearing housing of an exhaust-gas turbocharger, having an oil guide to at least one bearing point in the bearing housing. The oil guide is formed by a plurality of intersecting ducts in the interior of the bearing housing. Said individual ducts are formed as bores and/or cutouts in the bearing housing. According to the invention, there is formed in the oil guide a siphon which is integrated into the bearing housing. After the engine is shut down, the oil collects in said siphon and is available for a later cold start much more quickly than in the prior art. The oil is forced out of the siphon to the bearing points by the pressure fluctuations arising during the starting of the engine.

In a preferred embodiment, the oil guide comprises two ducts for the supply of the oil to a third distributor duct. Ducts one and two intersect so as to form the siphon. In particular if the first duct runs vertically, the two ducts intersect at an angle greater than 90°. The first duct is in particular arranged eccentrically with respect to a central axis of the bearing points. In this way, the siphon is also arranged slightly off-center, and there is adequate space available within the bearing housing for forming the siphon. The second duct is formed in particular as a bore which leads obliquely from bottom to top.

As already mentioned, a third duct for distributing the oil to a plurality of bearing points is provided. Said third duct runs in particular parallel to the central axis of the bearing points. Ducts to the individual bearing points preferably branch off from said third duct, or said duct leads directly to a bearing point. The second duct intersects the first and third duct so as to form the siphon. The oil thus passes from the first duct into the second duct, onward into the third duct, and from there to the bearing points.

The second duct may be closed off for example by means of a plug. Said plug thus forms the base of the siphon. In a particularly preferred embodiment, said plug is formed as a heating element. Said heating element may be in the form of a glow plug, for example. By means of said heating element, the oil is heated before or during the starting of the engine, resulting in a further improvement of the lubrication of the bearing points.

The invention furthermore comprises an exhaust-gas turbocharger having a bearing housing as just described. Here, the bearing points in the bearing housing serve for mounting a shaft which connects the turbine wheel to the compressor wheel of the exhaust-gas turbocharger. The embodiments discussed with regard to the bearing housing can be applied correspondingly advantageously to the exhaust-gas turbocharger according to the invention.

Figure 2:
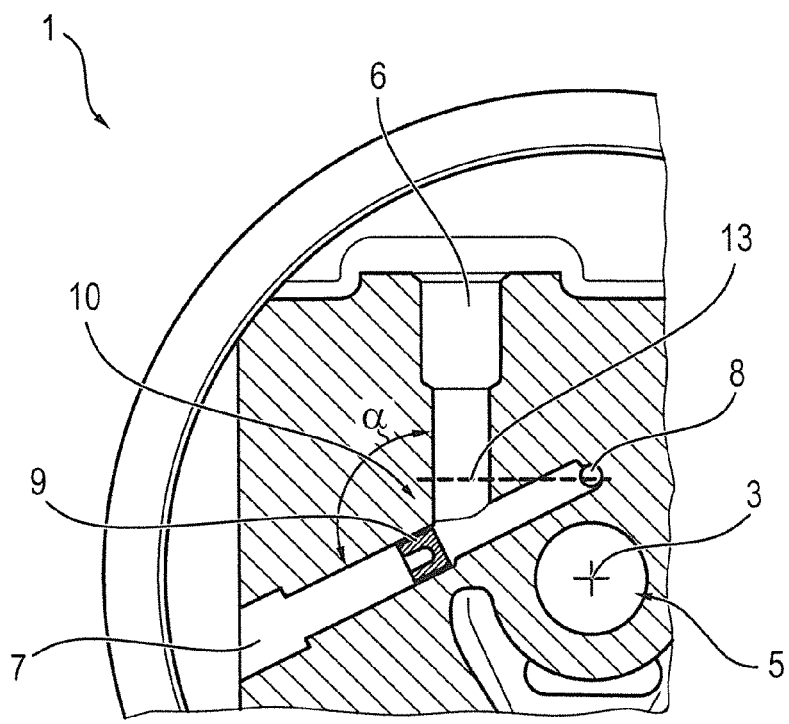
Figure 3:
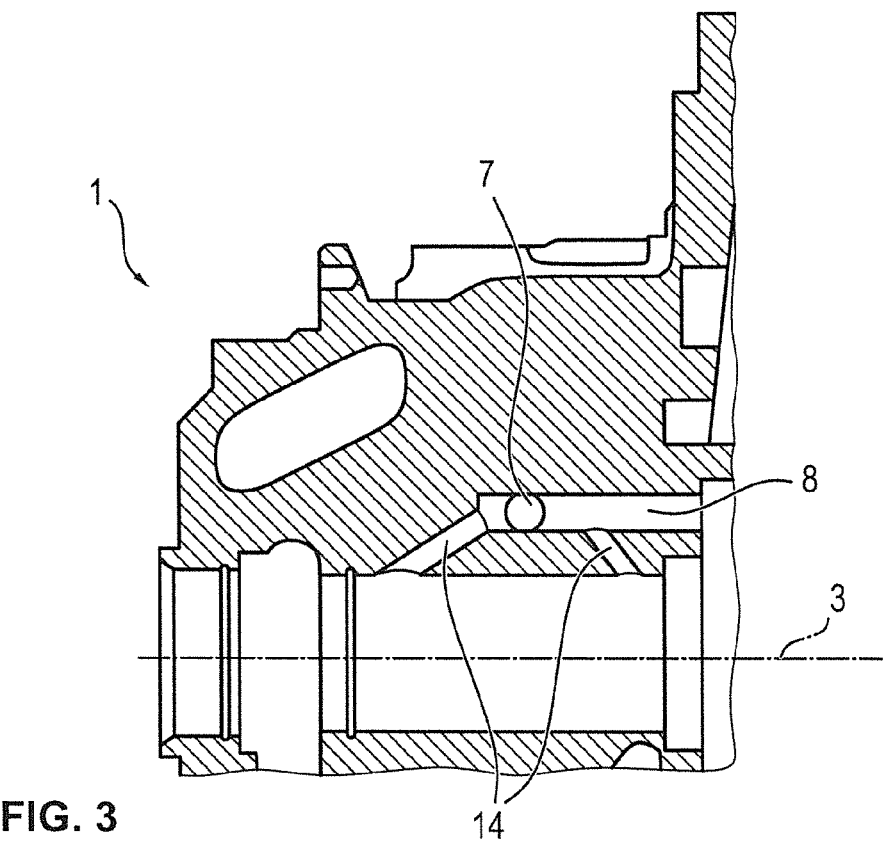
Figure 4:
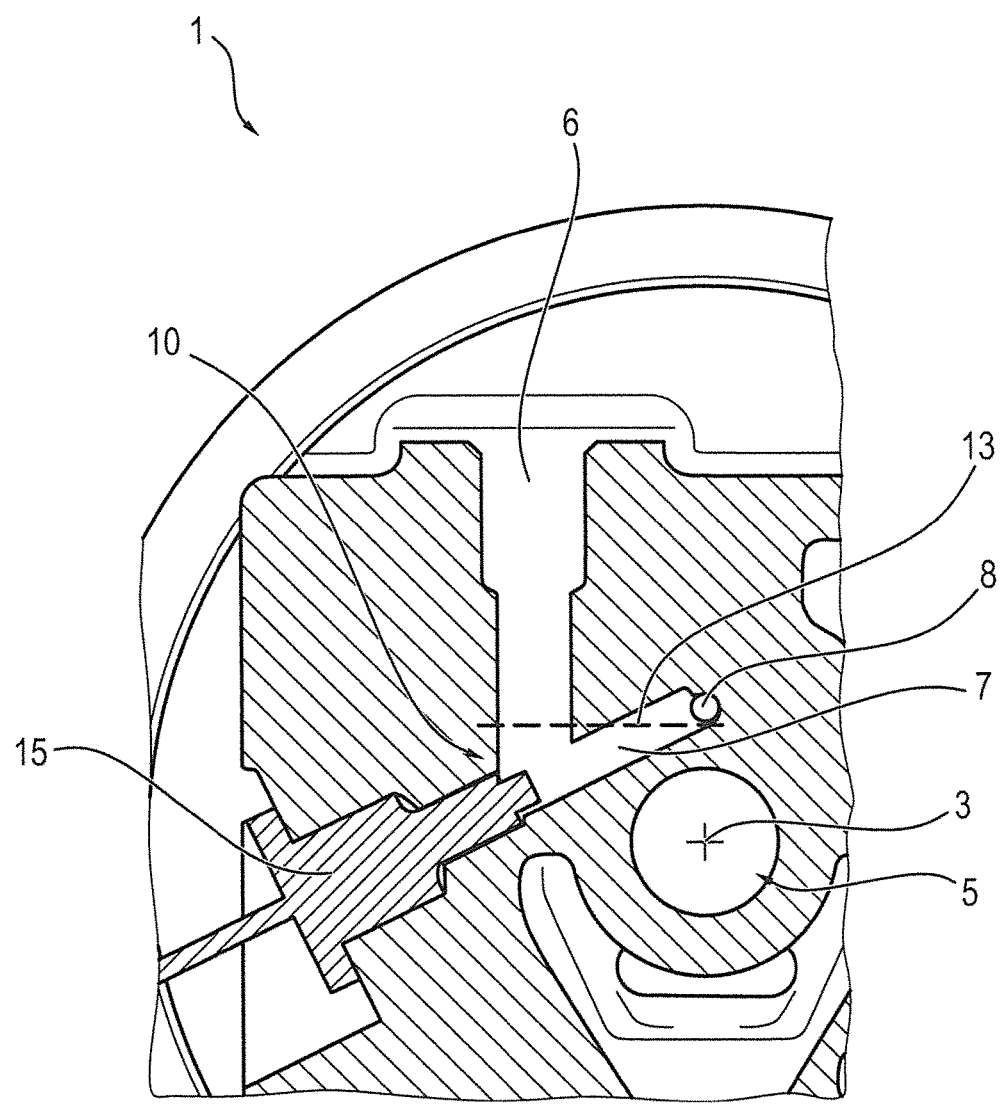

Further details, advantages and features of the present invention will emerge from the following description of exemplary embodiments on the basis of the appended drawing, in which:

FIG. 1 shows a schematically highly simplified illustration of an exhaust-gas turbocharger which can be provided with a bearing housing according to the invention, FIG. 2 shows a first detail view of the bearing housing according to the invention as per a first embodiment, FIG. 3 shows a second detail view of the bearing housing according to the invention as per the first embodiment, and FIG. 4 shows a detail view of the bearing housing according to the invention as per a second embodiment.

FIG. 1 is a schematically highly simplified sketch of an exhaust-gas turbocharger 2, for the purpose of illustrating the basic components thereof.

The exhaust-gas turbocharger 2 has a bearing housing 1 which connects a turbine housing to a compressor housing. A turbine wheel 11 is arranged in the turbine housing. A compressor wheel 12 is arranged in the compressor housing. The turbine wheel 11 is connected to the compressor wheel 12 via a shaft 4. The shaft 4 extends along a central axis 3.

FIG. 2 shows a part of the bearing housing 1 according to the invention as per the first embodiment. For clarity, the shaft 4 has been omitted, and only the central axis 3 is shown. Around said central axis 3, in turn, generally two radial bearing points 5 for the shaft 4 are situated in the bearing housing 1. Said bearing points 5 are supplied with oil via an oil guide integrated in the bearing housing 1.

The oil guide comprises a first duct 6, a second duct 7 and a third duct 8. The individual ducts 6, 7, 8 are formed as bores in the bearing housing 1.

The first duct 6 leads from the outside into the bearing housing 1. The oil is supplied via the first duct 6. The first duct 6 is arranged perpendicular to the central axis 3 but runs off-center and thus eccentrically with respect to the central axis 3.

The second duct 7 intersects a lower end of the first duct 6. The first duct 6 and the second duct 7 are formed at an angle α greater than 90° relative to one another. An inner end of the second duct 7 opens into the third duct 8. Via said third duct 8, the oil is distributed to the individual bearing points 5. Said third duct 8 is situated higher than the point of intersection between the first duct 6 and the second duct 7. In this way, a part of the first duct 6 and a part of the second duct 7 form a siphon 10 within the bearing housing 1. The maximum fill level of said siphon 10 is denoted by the line 13 in FIG. 2.

An outer end of the second duct 7 is closed off by means of a closure plug 9 which thus forms the base of the siphon 10.

FIG. 3 shows a further detail view of the bearing housing 1 according to the first embodiment. It is shown here how two branch ducts 14 lead from the third duct 8 to the individual bearing points 5. The start of the third duct 8 serves, in the example, for the supply of oil to the axial bearing.

FIG. 4 shows a detail view of the bearing housing 1 according to a second embodiment. Identical or functionally identical components are denoted by the same reference symbols in all of the embodiments. The two embodiments differ in that, in the second embodiment, the closure plug 9 is in the form of a heating element 15. Said heating element 15 performs, firstly, the function of the plug 9, and thus serves for sealing off the second duct 7. The oil in the siphon 10 can be heated by means of said heating element 15 in particular before or during the cold start of an engine.

In addition to the above written description of the invention, reference is hereby explicitly made, for disclosure supplementary thereto, to the diagrammatic illustration of the invention in FIGS. 1 to 4.

LIST OF REFERENCE SYMBOLS

1 Bearing housing
2 Exhaust-gas turbocharger
3 Central axis
4 Shaft
5 Bearing point
6 First duct
7 Second duct
8 Third duct
9 Closure plug
10 Siphon
11 Turbine wheel
12 Compressor wheel
13 Fill limit
14 Branch duct
15 Heating element
α Angle, in particular between 100° and 170°, in particular between 110° and 160°.

The invention claimed is:

1. A bearing housing (1) of an exhaust-gas turbocharger (2),
    having an oil guide within the bearing housing through which oil flows from an oil supply inlet to at least one bearing point (5) in the bearing housing (1),
    wherein the oil guide is formed by at least one of bores and cutouts in the bearing housing (1), and
    wherein there is formed in the oil guide, when the bearing housing is in the installed orientation, a flow path including a first segment (6) through which oil flows downward, followed by a second segment through which oil flows upward, followed by a third segment (14) through which oil flows downward to said at least one bearing point (5) in the bearing housing (1), wherein an oil collecting reservoir is formed between the first segment (6) and second segment (7) in which oil collects after engine shut-down, which reservoir is integrated into the bearing housing (1).

2. The bearing housing as claimed in claim 1, wherein the first segment (6), second segment (7) and third segment (14) of the oil guide are straight bores, respectively, and wherein the second segment (7) is closed off at one end by means of a plug (9).

3. The bearing housing as claimed in claim 2, wherein the plug (9) is a heating element (15).

4. The bearing housing (1) as claimed in claim 1, wherein said at least one bearing point (5) comprises first and second axially separated bearing points, and wherein an oil passage (8) is provided in said oil guide for axially distributing oil to said first and second axially separated bearing points.

5. An exhaust-gas turbocharger (2) having at least one bearing housing (1),
    having an oil guide through which oil flows from an oil supply inlet to at least one bearing point (5) in the bearing housing (1),
    wherein the oil guide is formed by at least one of bores and cutouts in the bearing housing (1), and
    wherein there is formed in the oil guide, when the bearing housing is in the installed orientation, a flow path including a first segment (6) through which oil flows downward, followed by a second segment (7) through which oil flows upward, followed by a third segment (14) through which oil flows downward to said at least one bearing point (5) in the bearing housing (1), wherein an oil collecting reservoir is formed between the first segment (6) and second segment (7) in which oil collects after engine shut-down, which reservoir is integrated into the bearing housing (1), and
    wherein the at least one bearing point (5) is for mounting a shaft (4) which connects a turbine wheel (11) to a compressor wheel (12) of the exhaust-gas turbocharger (2).

6. The exhaust-gas turbocharger (2) as claimed in claim 5, wherein the first segment (6), second segment (7) and third segment (14) of the oil guide are straight bores, respectively, and wherein the second segment (7) is closed off at one end by means of a plug (9).

7. The bearing housing as claimed in claim 6, wherein the plug (9) is a heating element (15).

* * * * *